United States Patent
Athley et al.

(10) Patent No.: US 10,224,997 B2
(45) Date of Patent: Mar. 5, 2019

(54) METHOD AND COMMUNICATION DEVICE FOR DETERMINING BEAM FOR USE

(71) Applicant: TELEFONAKTIEBOLAGET LM ERICSSON (PUBL), Stockholm (SE)

(72) Inventors: Fredrik Athley, Kullavik (SE); Andreas Nilsson, Göteborg (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 199 days.

(21) Appl. No.: 15/306,503

(22) PCT Filed: Oct. 18, 2016

(86) PCT No.: PCT/EP2016/074928
§ 371 (c)(1),
(2) Date: Oct. 25, 2016

(87) PCT Pub. No.: WO2018/072814
PCT Pub. Date: Apr. 26, 2018

(65) Prior Publication Data
US 2018/0212668 A1    Jul. 26, 2018

(51) Int. Cl.
*H04B 7/08* (2006.01)
*H04W 72/08* (2009.01)
(Continued)

(52) U.S. Cl.
CPC .......... *H04B 7/088* (2013.01); *H04B 7/0617* (2013.01); *H04B 7/0814* (2013.01);
(Continued)

(58) Field of Classification Search
CPC .... H04B 7/088; H04B 7/0617; H04B 17/318; H04W 72/085; H04W 72/046; H04W 88/06
See application file for complete search history.

(56) References Cited

U.S. PATENT DOCUMENTS

| 6,167,286 A | 12/2000 | Ward et al. |
| 2006/0223477 A1 | 10/2006 | Nakagawa |
| 2009/0028225 A1* | 1/2009 | Runyon .................. H01Q 1/42 375/219 |

FOREIGN PATENT DOCUMENTS

WO    2009012377 A2    1/2009

OTHER PUBLICATIONS

International Search Report and Written Opinion issued in Application No. PCT/EP2016/074928 dated Jun. 26, 2017, 14 pages.

* cited by examiner

*Primary Examiner* — Dady Chery
(74) *Attorney, Agent, or Firm* — Rothwell, Figg, Ernst & Manbeck, p.c.

(57) ABSTRACT

A method of determining a beam for use in wireless communication is disclosed. The method is performed in a communication device comprising a digital receiver and an analog receiver. The method comprises receiving signaling on an active antenna port by using the digital receiver, measuring power of one or more beams received at one or more of a respective currently inactive antenna ports by using the analog receiver, and determining, the beam for use in the wireless communication by comparing received power of a beam received at the active antenna port to the power of the one or more beams received at the one or more respective currently inactive antenna port, and determining the beam for use to be the beam having the highest received power. A communication device, computer program and computer program products are also disclosed.

16 Claims, 4 Drawing Sheets (51) Int. Cl.
*H04W 72/04* (2009.01)
*H04B 17/318* (2015.01)
*H04B 7/06* (2006.01)
*H04W 88/06* (2009.01)

(52) U.S. Cl.
CPC ........ *H04B 17/318* (2015.01); *H04W 72/046* (2013.01); *H04W 72/085* (2013.01); *H04W 88/06* (2013.01)

Fig. 5

METHOD AND COMMUNICATION DEVICE FOR DETERMINING BEAM FOR USE

CROSS-REFERENCE TO RELATED APPLICATION(S)

This application is a 35 U.S.C. § 371 National Phase Entry Application from PCT/EP2016/074928, filed Oct. 18, 2016 and designating the United States. The content of the application is incorporated by reference.

TECHNICAL FIELD

The technology disclosed herein relates generally to the field of wireless communication and in particular to a method, communication device, computer program and computer program product for determining beam for use in wireless communication

BACKGROUND

There is a large variety of requirements for the next generation of mobile communications system (5G) implying that frequency bands at many different carrier frequencies will be needed. For instance, lower frequency bands will be needed to achieve sufficient coverage and higher frequency bands (e.g. mmW, i.e. near and above 30 GHz) will be needed to reach the required capacity. At high frequencies the propagation properties are more challenging and beamforming might be required both at a base station and at a communication device (e.g. a user equipment, UE, used as example in the following) in order to reach sufficient link budget.

UE antennas at high frequencies are more directive than UE antennas at lower frequencies which means that a single antenna element at a high frequency typically does not offer omnidirectional coverage. Therefore, multiple antenna elements with beam patterns pointing in different directions and with different polarizations are preferred at the UE in order to improve the link budget and to offer omnidirectional coverage.

There are in essence three different implementations of beamforming done at baseband that are being discussed for the UE: analog beamforming, digital beamforming and hybrid beamforming. Each implementation has its advantages and disadvantages. Digital beamforming is the most flexible solution but is also the most costly due to the higher number of required hardware components compared to analog solutions (e.g. radio frequency chains and baseband chains). Further, the high number of hardware components and the size associated thereto are drawbacks adding cost to the UE. The analog beamforming solution is the least flexible one but UE implementing such solutions are less costly to manufacture owing to a reduced number of radio- and baseband chains compared to the digital solution. Hybrid beamforming is a compromise between the analog and digital beamforming. Depending on cost, power consumption, and performance requirements of different UEs, different implementations will be needed. Due to hardware constraints at high frequencies (mmW), the most likely implementation in these frequency bands is analog beamforming.

At high frequencies, a conceivable UE beamforming implementation is to have a single baseband chain that is switched between several directional antennas. This would give an even less complex solution than the analog solution mentioned above. This is a way to achieve beamforming gain with omnidirectional coverage, although not simultaneously, at a low cost. A difficulty with this approach is to determine which antenna to use. Switching the baseband chain to different antennas in order to find the best one will lead to reduced data throughput since some (or all) antennas that are tested in the switching will have lower received power than the currently used antenna.

SUMMARY

An objective of the present teachings is to address and overcome or at least improve on the above mentioned difficulties. A particular objective is to provide a cost-efficient solution for providing beamforming with omnidirectional coverage. This objective and others are achieved by the methods, devices, computer programs and computer program products according to the appended independent claims, and by the embodiments according to the dependent claims.

The objective is according to an aspect achieved by a method of determining a beam for use in wireless communication. The method is performed in a communication device comprising a digital receiver and an analog receiver. The method comprises receiving signaling on an active antenna port by using the digital receiver; measuring power of one or more beams received at one or more of a respective currently inactive antenna ports by using the analog receiver; determining, the beam for use in the wireless communication by comparing received power of a beam received at the active antenna port to the power of the one or more beams received at the one or more respective currently inactive antenna port, and determining the beam for use to be the beam having the highest received power.

The method provides a number of advantages. For instance, the communication device is enabled to use the currently best antenna by means of the testing that is performed by the analog receiver, which comprises low cost components having low power consumption. This increases the performance and extends the battery life of the communication device. The determination of best antenna to use can be done without reducing data throughput, since the base band chain is used by the active antenna and is, in some embodiments, not involved in the determination.

The objective is according to an aspect achieved by a computer program for a communication device for determining a beam to use in wireless communication. The computer program comprises computer program code, which, when executed on at least one processor on the communication device causes the communication device to perform the method as above.

The objective is according to an aspect achieved by a computer program product comprising a computer program as above and a computer readable means on which the computer program is stored.

The objective is according to an aspect achieved by a communication device for determining a beam for use in wireless communication. The communication device comprises a digital receiver and an analog receiver. The communication device is configured to: receive signaling on an active antenna port by using the digital receiver; measure power of one or more beams received at one or more of a respective currently inactive antenna ports by using the analog receiver; determine, the beam for use in the wireless communication by comparing received power of a beam received at the active antenna port to the power of the one or more beams received at the one or more respective currently inactive antenna port, and determine the beam for use to be the beam having the highest received power.

Further features and advantages of the embodiments of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present teachings provide a solution wherein a digital receiver in a UE is complemented with a low cost analog receiver. The analog receiver is switched (e.g. cyclically) between the different antennas of the UE in order to constantly keep track of the antenna with highest received power. If it is detected that an inactive antenna has a higher received power than the active antenna (the one to which the baseband chain is connected), the baseband chain is switched to the antenna with highest received power.

Figure 1:
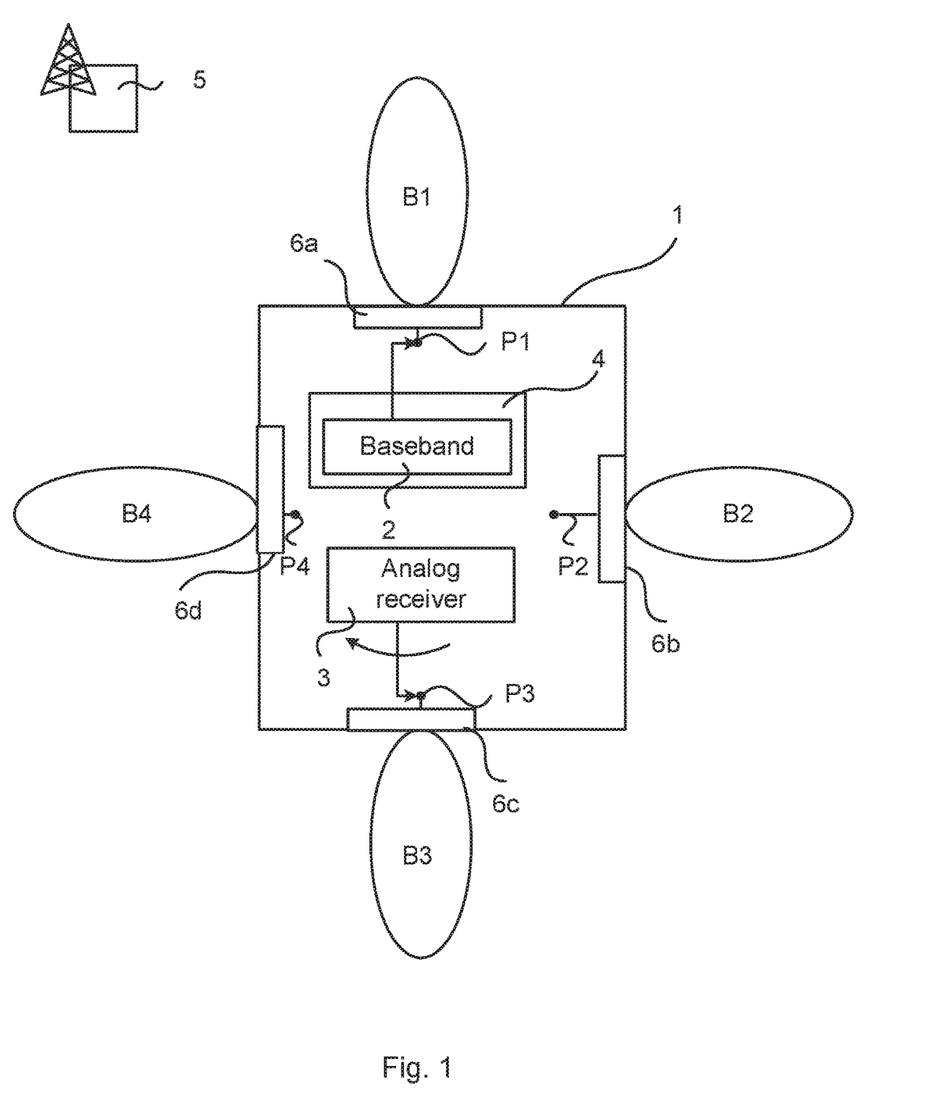
FIG. 1 illustrates schematically an environment in which embodiments according to the present teachings may be implemented.

FIG. 1 illustrates schematically an environment in which embodiments according to the present teachings may be implemented.

A communication device 1, exemplified by a UE, comprises multiple antennas, e.g. directive antennas 6a, 6b, 6c, 6d placed along each side of the UE 1, thereby providing omnidirectional coverage. The respective antennas 6a, 6b, 6c, 6d have beam patterns B1, B2, B3, B4 pointing in different directions (possibly with different polarizations).

The UE 1 comprises a digital receiver 4, which in the illustrated case is connected to a baseband chain 2. According to the present teachings, the UE is, in addition to the digital receiver 4, also provided with a low cost analog receiver 3 that is switched between the different antennas 6a, 6b, 6c, 6d. The switching is performed in order to constantly keep track of the antenna 6a, 6b, 6c, 6d that has the highest received power. The switching can, for instance, be performed cyclically or upon need, e.g. when the received power on the active antenna 6a is found to fall below a certain threshold value.

The analog receiver 3 measures the received signal power on each antenna 6a, 6b, 6c, 6d. If it is detected that an inactive antenna has a higher received power than the active antenna (which is the one to which the baseband chain 2 is connected), the baseband chain 2 is temporarily switched to the antenna with highest received power. The analog receiver 3 measures the received signal power on each antenna 6a, 6b, 6c, 6d disregarding whether the received power comes from a serving node 5 (e.g. an eNodeB or other access point serving the UE 1) or from some interferer, i.e. the analog receiver 3 measures the total power received within a certain bandwidth without taking into account what type of signal it is receiving. Therefore, it may not be possible to know if the received power is from a useful source (i.e. from the serving node 5) or just interference (e.g. neighboring node). In view of this, if a high power has been detected on an inactive antenna this should be investigated, e.g. by temporarily connecting the digital receiver 4 for a more detailed analysis. If the analysis shows that there is high power from the serving node 5, the digital receiver 4 remains connected to the new antenna.

An "antenna port" may be defined such that a channel over which a symbol on the antenna port is conveyed can be inferred from the channel over which another symbol on the same antenna port is conveyed.

Figure 2:
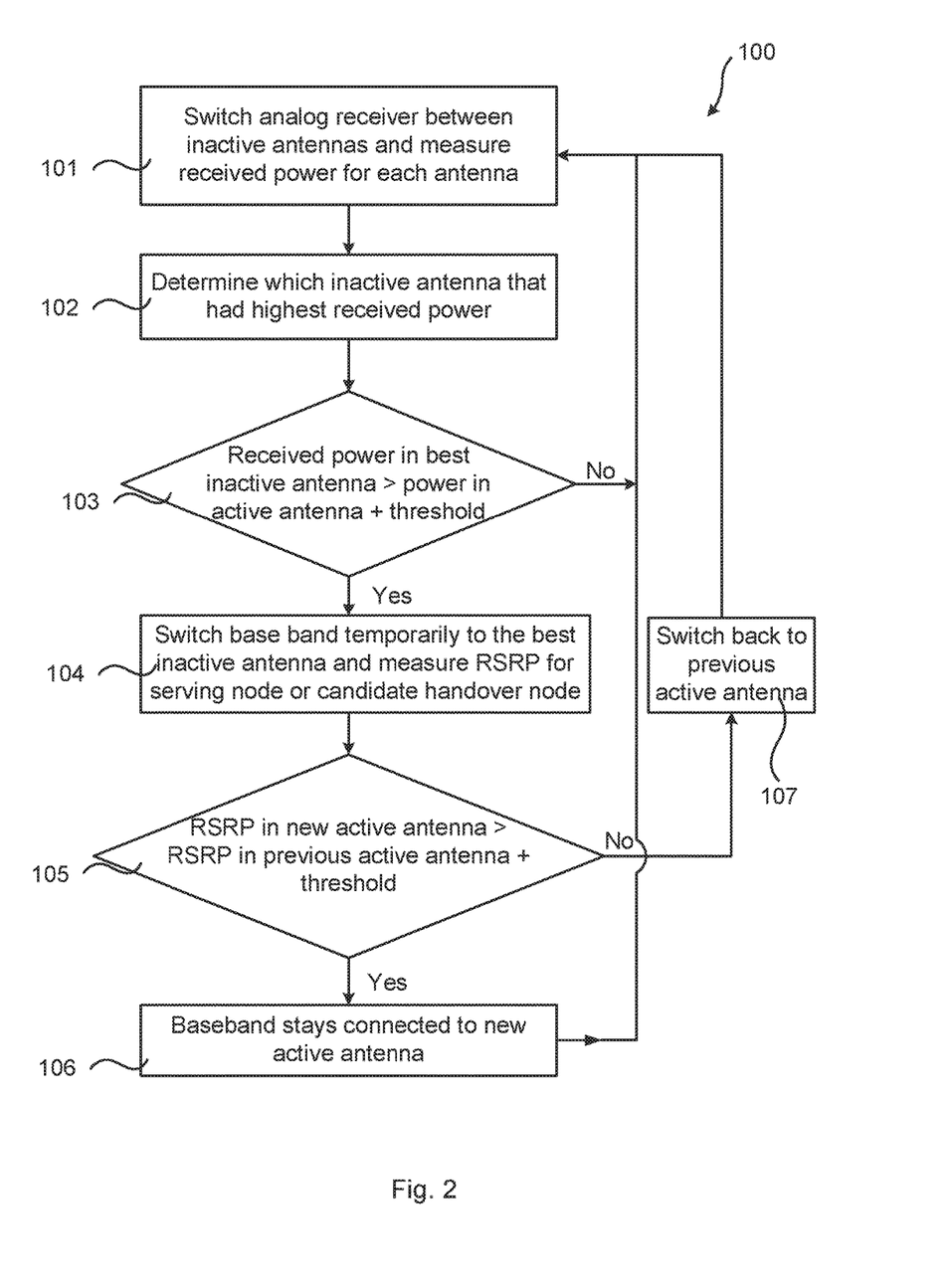
FIG. 2 illustrates a flow chart over steps of embodiments of a method in a communication device in accordance with the present teachings.

FIG. 2 shows a flow chart 100 of various embodiments of the disclosed method. In an exemplary scenario according to the present teachings, the current data transmission/reception is performed on a first antenna 6a, to which the baseband chain 2 is connected (i.e. the first antenna 6a is the active antenna). Simultaneously with this data transmission/reception, the analog receiver 3 measures the received power (e.g. cyclically) on the second, third and fourth antennas 6b, 6c and 6d and compares the received power with the received power on first antenna 6a. That is, in box 101, the analog receiver 3 is switched between the inactive antennas 6b, 6c and 6d and the received power is measured for each of these antennas 6b, 6c, 6d.

To be able to compare the received power in the baseband chain 2 and the analog receiver 3 they should be calibrated relative to each other so that they give the same power estimate for the same conducted power on the antenna port (in the FIG. 1 antenna ports are indicated by P1, P2, P3, P4). Such calibration can be done at manufacturing and/or by measurements on received signal levels during operation. In another embodiment, the calibration is done by connecting the analog receiver 3 also to the active antenna port P1 (the first antenna 6a of FIG. 1) to which the baseband chain 2 is connected. One way to do this is to switch for a short duration from the digital receiver 4 to the analog receiver 3 in subframes which do not have any data transmission scheduled for the UE 1, and thus only listen to other signals such as potential downlink reference or control signals or data transmissions to other UEs. Still another way to do the calibration is to connect the active antenna to both the digital receiver 4 and analog receiver 3 via a splitter (not illustrated).

In box 102, it is determined which inactive antenna 6b, 6c, 6d has the highest received power. Flow then continues to box 103.

In box 103, it is determined if the received power in the best inactive antenna (the inactive antenna e.g. having highest received power) is better than the currently active antenna 6a. In particular, the received power in best inactive antenna may be compared to received power in the active antenna. As shown in box 103, a threshold value may also be used in deciding which antenna to use. For instance, the received power in the best inactive antenna may be compared with the received power in the active antenna plus a threshold value (plus when power measured in dB, but subtracting a threshold value may also be conceivable).

Various other criteria may alternatively be used in deciding which antenna has the best performance in some sense, and hence which antenna should be used.

If the received power on the first, second or third antenna 6b, 6c and 6d is not higher than on the first antenna 6a then the flow returns to box 101.

If the received power on the first, second or third antenna 6b, 6c and 6d is higher than on the first antenna 6a flow continues to box 104. In box 104, the baseband chain 2 is temporarily switched to the antenna with highest received power, for example the second antenna 6b, in order to determine if this was useful signal power.

In box 105, it is determined if the received power in the antenna (among the inactive antennas 6b, 6c, 6d) with highest received power was useful signal power. The determining whether or not the received power was useful signal power, may, for instance, be determined by measuring, e.g., reference signal received power (RSRP) from the serving node 5 or from a potential candidate handover node. If the RSRP of the second antenna 6b is higher than the RSRP for antenna 1, the baseband chain 2 stays connected to the second antenna 6b (flow continues to box 106) otherwise flow continues to box 107, wherein the baseband chain 2 switches back to the first antenna 6a. If the received power on the second antenna 6b was found to be from an interferer, the second antenna 6b can be put in "quarantine" for some time so as to avoid that frequent switches back to this the second antenna 6b will occur when it only receives interference. Some hysteresis in the switching of the baseband chain 2 to different antennas 6b, 6c, 6d may be applied in order to avoid "ping pong" effects. For instance, as indicated in box 105, some threshold value may be applied: the RSRP in the new active antenna should be higher than sum (in dB) of the RSRP of the previous active antenna and a RSRP threshold value. It is noted that this comparison criterion is given purely as an example and that other criterion or several criteria may be used for deciding which antenna to use.

From boxes 106 and 107, flow returns to box 101, i.e. the method may be repeated.

The analog receiver 3 may comprise a filter (not shown in the figures) that is tuned to a certain serving carrier frequency band. In one embodiment the filter bandwidth is in the same order as the carrier bandwidth. In another embodiment an analog filter with tunable bandwidth and tunable center frequency is used to adapt to the (sub-)band that has been scheduled for the UE 1 or is used by the serving node 5 for downlink control signaling.

Still other embodiments, besides the above described, are possible. For example, the power measured by the analog receiver 3 can be compared with the power from the active antenna after each switching, i.e. one by one, instead of waiting until all inactive antennas have been switched through.

In another embodiment the analog receiver 3 and the switching thereof is not activated until the signal quality in the active antenna drops below a certain threshold. This can reduce the power consumption if the signal quality in the active antenna is sufficiently high, since the analog receiver is only turned on when needed.

In another embodiment the UE keeps track of the received power for the different inactive antennas even though they are weaker than the active antenna. In case the active antenna gets blocked, the UE 1 switches to a new antenna based on the received power of the inactive antennas.

In another embodiment each directive antenna 6a, 6b, 6c, 6d comprises an array of antennas with analog phase shifters such that the beam B1, B2, B3, B4 of each directive antenna can be beamformed. In this case the analog receiver 3 can be used not only to evaluate received power for the different directive antennas 6a, 6b, 6c, 6d, but also evaluate received power for different phase shifter settings for respective directive antenna.

To improve the power measurement one can use information from baseband chain 2 to decide how to measure. One method is to tune the analog receiver to measure the entire, or part of, the scheduled band. Having a fixed measurement bandwidth may imply a simpler implementation since only the center frequency is to be changed. Another method is to combine frequency selectivity with time selectivity, for example to measure only on control signals. Timing info for this can be supplied by the baseband chain 2.

A beam-finding, antenna switching in a communication device 1 is thus suggested, wherein a simple, low cost analog receiver 3 is used in addition to an existing digital receiver 4 in the communication device 1. The analog receiver 3 is used in order to find the antenna best suited for reception/transmission, e.g. the antenna with the highest received power.

The various features and embodiments that have been described can be combined in many different ways, examples of which are given in the following, with reference first to FIG. 3.

Figure 3:
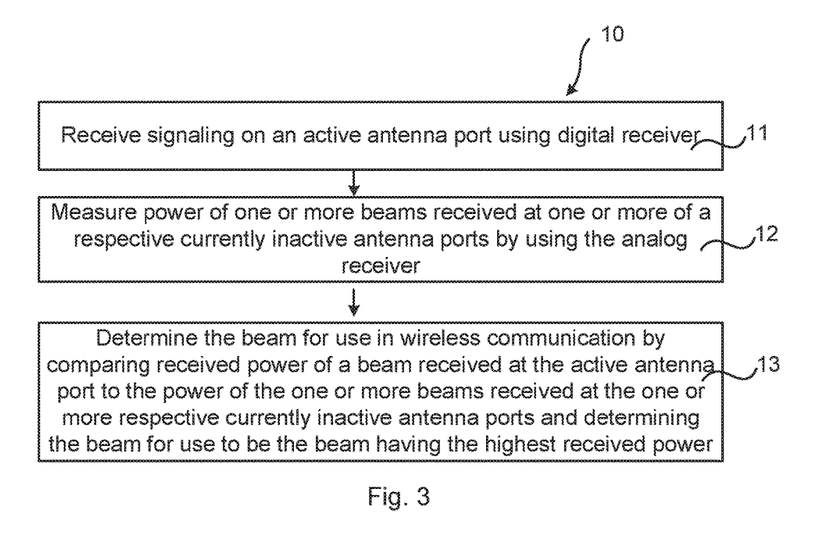
FIG. 3 illustrates a flow chart over steps of an embodiment of a method in a communication device in accordance with the present teachings.

FIG. 3 illustrates a flow chart over steps of an embodiment of a method in a communication device 1 in accordance with the present teachings.

A method 10 of determining a beam for use in wireless communication is provided. The method 10 may be performed in a communication device 1 that comprises a digital receiver 4 and an analog receiver 3. The analog receiver 3 is provided for use in keeping track of which antenna among the currently inactive ones that has the highest received power.

The method 10 comprises receiving 11 signaling on an active antenna port P1 by using the digital receiver 4. As noted earlier, an "active antenna" or "active antenna port" is the antenna (and antenna port) to which the baseband chain is connected.

The method 10 comprises measuring 12 power of one or more beams received at one or more of a respective currently inactive antenna ports P2, P3, P4 by using the analog receiver 3.

The method 10 comprises determining 13, the beam for use in the wireless communication by comparing received power of a beam received at the active antenna port P1 to the power of the one or more beams received at the one or more respective currently inactive antenna port P2, P3, P4, and determining the beam for use to be the beam having the highest received power.

The method 10 provides a number of advantages. For instance, the cost of the communication device can be kept down since the herein suggested use of an analog receiver and a digital receiver is more cost-efficient than having two digital receiver chains. The communication device may have directional antennas for covering all directions (i.e. able to receive signaling from any direction), and the analog receiver is used for ensuring that the antenna currently having the best reception is used. Further, the battery power of the communication device can be reduced compared to having two digital receivers.

In an embodiment, the method 10 comprises, for the case that the received power at one of the currently inactive antenna ports is higher than the received power at the active antenna port:

switching the digital receiver 4 to the currently inactive antenna port having the highest received power, measuring on one or both of a signal received from a serving network node 4 and a signal received from a handover network node, and determining the beam to use to be the beam having the highest received power.

In some embodiments, the determining the beam for use in the wireless communication comprises, before the comparing, calibrating the power received at the active antenna port P1 relative the measured power of the one or more beams received at the one or more respective currently inactive antenna ports P2, P3, P4 by using the analog receiver 3. By means of this embodiment, hysteresis is used for avoiding undesired ping-pong effects when the power received at the inactive antenna port is close to the power received at the active antenna port.

In an embodiment, the method 10 comprises evaluating received power for different antenna port definitions of each antenna port at the analog receiver 3. Different antenna port definitions may comprise different phase shifter settings of an analog beamformer. The evaluation may, for instance, comprise evaluating received power for different phase shifter settings of each antenna port. An antenna port may have an analog beam forming network comprising the phase shifters. Other ways of evaluating the received power are also possible, e.g. using parasitic elements that are switched in and switched out.

In an embodiment, the method 10 comprises, before the measuring 12, tuning the analog receiver 3 to measure an entire scheduled bandwidth or to measure only part of the scheduled bandwidth. As has been described earlier, a simpler implementation and hence less costly, is to have a fixed bandwidth which the communication device measures on.

In an embodiment, the method 10 comprises storing a measurement value for at least one of the currently inactive antenna ports P2, P3, P4. By means of this embodiment, the communication device 1 is enabled to quickly switch to the new antenna, should the active antenna e.g. be blocked. This switching can be made quickly since no measurements are needed.

Figure 4:
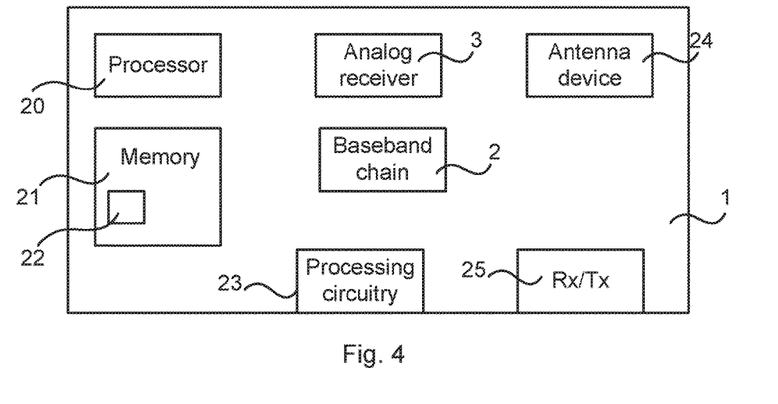
FIG. 4 illustrates schematically a communication device and means for implementing embodiments of the method in accordance with the present teachings.

FIG. 4 illustrates schematically a communication device and means for implementing embodiments of the method in accordance with the present teachings.

The communication device 1 comprises a processor 20 comprising any combination of one or more of a central processing unit (CPU), multiprocessor, microcontroller, digital signal processor (DSP), application specific integrated circuit etc. capable of executing software instructions stored in a memory 21 which can thus be a computer program product. The processor 20 can be configured to execute any of the various embodiments of the method 10 for instance as described in relation to FIGS. 2 and 3.

The memory 21 of the communication device 1 can be any combination of read and write memory (RAM) and read only memory (ROM), Flash memory, magnetic tape, Compact Disc (CD)-ROM, digital versatile disc (DVD), Blu-ray disc etc. The memory 21 may also comprise persistent storage, which, for example, can be any single one or combination of magnetic memory, optical memory, solid state memory or even remotely mounted memory.

The communication device 1 comprises an antenna device 24. Although illustrated as a single device, the communication device 1 may comprise several devices. For instance, the antenna device 24 may comprise several antennas, e.g. directional antennas, wherein each directional antenna comprises e.g. a single radiating element or a subarray of radiating elements interconnected with a fixed feeding network.

The communication device 1 comprises an analog receiver 3, as has been described. The analog receiver 3 is switched between the different antennas of the antenna device 24 for establishing which antenna to use (according to the described method 10).

The communication device 1 may comprise an interface 25 for communication with other devices and/or entities. The interface 25 may, for instance, comprise a protocol stack, for communication with other devices or entities. The interface may be used for receiving data input and for outputting data.

The communication device 1 may comprise additional processing circuitry, indicated at reference numerals 23 for implementing the various embodiments according to the present teachings.

The communication device 1 may comprise a baseband chain 2 (also denoted baseband processor). The baseband chain 2 may handle e.g. filtering, synchronization, channel compensation, modulation etc. A radio frequency chain 25 may comprise components not explicitly shown in the figures. For instance, components such as low noise amplifiers, frequency converters and analog to digital (A/D) converters to down-conversion to baseband.

A communication device 1 is provided for determining a beam for use in wireless communication. The communication device 1 comprises a digital receiver 4 and an analog receiver 3. The communication device 1 is configured to:

receive signaling on an active antenna port P1 by using the digital receiver 4, measure power of one or more beams received at one or more of a respective currently inactive antenna polls P2, P3, P4 by using the analog receiver 3, determine, the beam for use in the wireless communication by comparing received power of a beam received at the active antenna port P1 to the power of the one or more beams received at the one or more respective currently inactive antenna port P2, P3, P4, and determine the beam for use to be the beam having the highest received power.

Since the analog receiver 3 does not contain e.g. any analog-to-digital (A/D) converter or digital parts, the cost and power consumption can be much lower than a corresponding digital solution (a corresponding digital solution understood as comprising two digital receivers).

The communication device 1 may be configured to perform the above steps e.g. by comprising one or more processors 20 and memory 21, the memory 21 containing instructions executable by the processor 20, whereby the communication device 1 is operative to perform the steps.

In an embodiment thus, a communication device is provided for determining a beam for use in wireless communication. The communication device comprises a digital receiver and an analog receiver. The communication device comprises one or more processors and memory, the memory containing instructions executable by the processor, whereby the communication device is operative to: receive signaling on an active antenna port by using the digital receiver; measure power of one or more beams received at one or more of a respective currently inactive antenna ports by using the analog receiver; determine, the beam for use in the wireless communication by comparing received power of a beam received at the active antenna port to the power of the one or more beams received at the one or more respective currently inactive antenna port, and determine the beam for use to be the beam having the highest received power.

In an embodiment, the communication device 1 is configured to, for the case that the received power at one of the currently inactive antenna ports is higher than the received power at the active antenna port:

switch the digital receiver 4 to the currently inactive antenna port having the highest received power, measure on one or both of a signal received from a serving network node 4 and a signal received from a handover network node, and determine the beam to use to be the beam having the highest received power.

In some embodiments, the communication device 1 is configured to determine the beam for use in the wireless communication by, before the comparing, calibrating the power received at the active antenna port P1 relative the measured power of the one or more beams received at the one or more respective currently inactive antenna ports P2, P3, P4 by using the analog receiver 3.

In various embodiments, the communication device 1 is configured to evaluate received power for different antenna port definitions of each antenna port at the analog receiver 3.

In various embodiments, the communication device 1 is configured to, before the measuring, tune the analog receiver 3 to measure an entire scheduled bandwidth or to measure only part of the scheduled bandwidth.

In various embodiments, the communication device 1 is configured to store a measurement value for at least one of the currently inactive antenna ports P2, P3, P4. For instance, and as has been described, even though different inactive antennas have lower received power than the currently active antenna, e.g. the RSRP of one or more of these different inactive antennas can be stored to a memory or database. If the communication device 1 looses reception it can swiftly connect to e.g. the inactive antenna that has the highest RSRP among the stored values.

The present teachings also encompass a computer program 22 for a communication device 1 for determining a beam for use in wireless communication. The computer program 22 comprises computer program code, which, when executed on at least one processor on the communication device 1, causes the communication device 1 to perform the method 10 according to any of the described embodiments.

The present teachings also encompass computer program products 21 for a communication device 1. The computer program product 21 comprises the computer program 22 for implementing the embodiments of the methods as described, and a computer readable means on which the computer program 22 is stored. The computer program product, or the memory, thus comprises instructions executable by the processor 20. Such instructions may be comprised in a computer program, or in one or more software modules or function modules. The computer program product 21 may, as mentioned earlier, be any combination of random access memory (RAM) or read only memory (ROM), Flash memory, magnetic tape, Compact Disc (CD)-ROM, digital versatile disc (DVD), Blu-ray disc etc.

Figure 5:
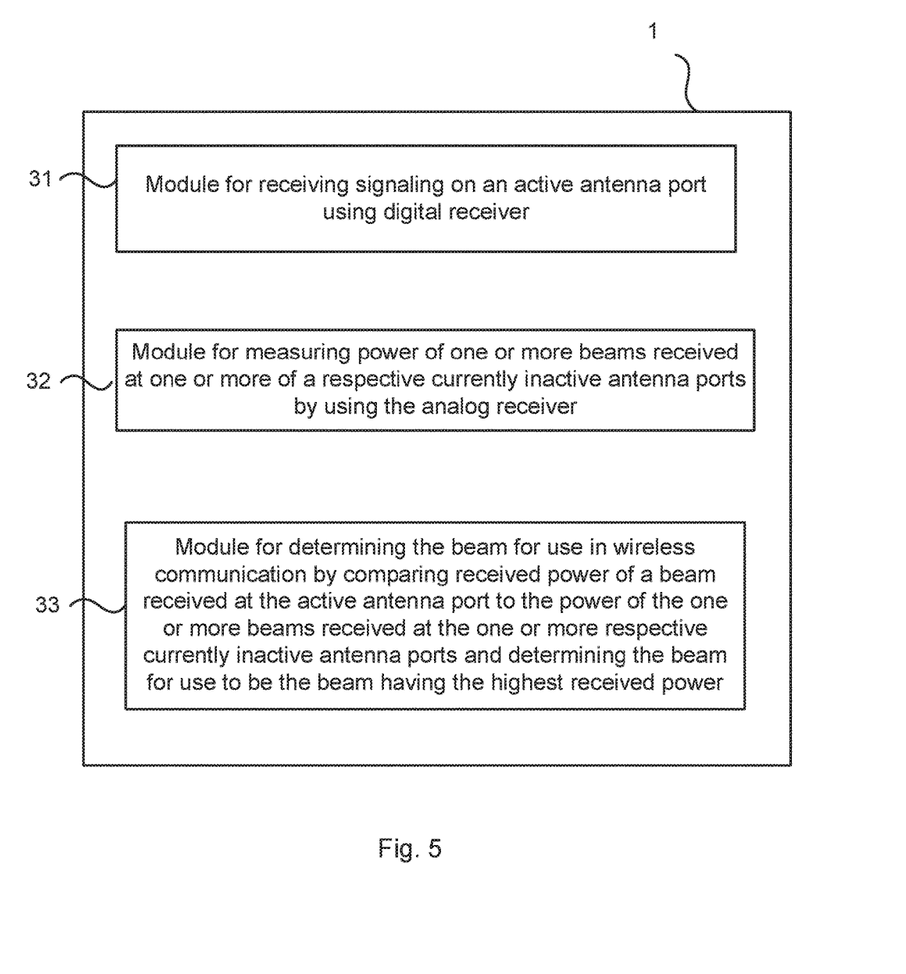
FIG. 5 illustrates a communication device comprising function modules/software modules for implementing embodiments of the present teachings.

FIG. 5 illustrates a communication device comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A communication device comprising a digital receiver and an analog receiver is provided for determining a beam for use in wireless communication. The communication device comprises a first module 31 for receiving signaling on an active antenna port by using the digital receiver. Such first module 31 may, for instance, comprise receiving circuitry or an input device.

The communication device comprises a second module 32 for measuring power of one or more beams received at one or more of a respective currently inactive antenna ports by using the analog receiver. Such second module 32 may, for instance, comprise processing circuitry adapted for measuring power.

The communication device comprises a third module 33 for determining the beam for use in the wireless communication by comparing received power of a beam received at the active antenna port to the power of the one or more beams received at the one or more respective currently inactive antenna port, and determining the beam for use to be the beam having the highest received power. Such third module 33 may, for instance, comprise processing circuitry adapted for determining beam for use and processing circuitry adapted for comparing received power.

It is noted that one or more of the modules 31, 32, 33 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method of determining a beam for use in wireless communication, the method being performed by a communication device comprising an analog receiver and a digital receiver that operates independently of the analog receiver such that, while the analog receiver is communicatively connected to a currently inactive antenna port, the digital receiver can be communicatively disconnected from the currently inactive antenna port to which the analog receiver is communicatively connected and can be communicatively connected to an active antenna port, the method comprising:

communicatively connecting the digital receiver to the active antenna port, wherein the digital receiver is communicatively connected to the active antenna port for at least a first period of time and during the first period of time the digital receiver is not communicatively connected to the active antenna port via the analog receiver;

communicatively connecting the analog receiver to the currently inactive antenna port, wherein while the analog receiver is communicatively connected to the currently inactive antenna port the digital receiver is not communicatively connected to the currently inactive antenna port;

during the first period of time, receiving signaling on the active antenna port by using the digital receiver;

measuring power of a beam received at the currently inactive antenna port by using the analog receiver; and determining a beam for use in the wireless communication, wherein the determining comprises comparing a received power of a beam received at the active antenna port to the power of the beam received at the currently inactive antenna port, and the determined beam for use is a beam having a highest received power.

2. The method as claimed in claim 1, wherein the step of determining the beam for use in the wireless communication further comprises:

switching the digital receiver to the currently inactive antenna port as a result of determining that the received power at the currently inactive port is higher than the received power at the active antenna port, and measuring on at least one of: a signal received from a serving network node and a signal received from a handover network node.

3. The method as claimed in claim 1, wherein the determining the beam for use in the wireless communication comprises, before the comparing, calibrating the power received at the active antenna port relative the measured power of the beam received at the currently inactive antenna port by using the analog receiver.

4. The method as claimed in claim 1, further comprising evaluating received power for different antenna port definitions of each antenna port at the analog receiver.

5. The method as claimed in claim 1, further comprising, before the measuring, tuning the analog receiver to measure an entire scheduled bandwidth or to measure only part of the scheduled bandwidth.

6. The method as claimed in claim 1, wherein the step of connecting the analog receiver to the currently inactive antenna port occurs during the first period of time.

7. A computer program product comprising a non-transitory computer readable medium comprising a computer program for a communication device for determining a beam to use in wireless communication, the computer program comprising computer program code, which, when executed on at least one processor on the communication device causes the communication device to perform the method according to claim 1.

8. A communication device for determining a beam for use in wireless communication, the communication device comprising:

an active antenna port;

a currently inactive antenna port;

an analog receiver; and a digital receiver that operates independently of the analog receiver such that, while the analog receiver is communicatively connected to the currently inactive antenna port, the digital receiver can be communicatively disconnected from the currently inactive antenna port to which the analog receiver is communicatively connected and can be communicatively connected to an active antenna port, wherein the communication device is configured to:

communicatively connect the digital receiver to the active antenna port for at least a first period of time and during the first period of time the digital receiver is not connected to the active antenna port via the analog receiver;

communicatively connect the analog receiver to the currently inactive antenna port, wherein while the analog receiver is communicatively connected to the currently inactive antenna port the digital receiver is not communicatively connected to the currently inactive antenna port;

receive signaling on the active antenna port by using the digital receiver;

measure power of a beam received at the currently inactive antenna port by using the analog receiver; and determine a beam for use in the wireless communication by performing a process that comprises: comparing a received power of a beam received at the active antenna port to the power of the beam received at the currently inactive antenna port, and, based on the comparison, determining whether the received power of the beam received at the currently inactive antenna port is higher than the received power of the beam received at the active antenna port.

9. The communication device as claimed in claim 8, wherein the communication device is configured such that, as a result of the communication device determining that the received power at the currently inactive antenna port is higher than the received power at the active antenna port, the communicate device:

switches the digital receiver to the currently inactive antenna port, after switching the digital receiver to the currently inactive antenna port, measuring a received power of a signal transmitted by a network node and received at the currently inactive antenna port, wherein the network node is one of a serving network node and a handover network node, and comparing the received power of the signal transmitted by the network node and received at the currently inactive antenna port with the received power at the active antenna port.

10. The communication device as claimed in claim 8, configured to determine the beam for use in the wireless communication by, before the comparing, calibrating the power received at the active antenna port relative the measured power of the beam received at the currently inactive antenna port by using the analog receiver.

11. The communication device as claimed in claim 8, configured to evaluate received power for different antenna port definitions of each antenna port at the analog receiver.

12. The communication device as claimed in claim 8, configured to, before the measuring, tune the analog receiver to measure an entire scheduled bandwidth or to measure only part of the scheduled bandwidth.

13. The communication device as claimed in claim 8, configured to store a measurement value for at least one of the currently inactive antenna ports.

14. A method of determining a beam for use in wireless communication, the method being performed by a communication device comprising a digital receiver comprising a baseband chain, an analog receiver, a first antenna, and a second antenna, wherein the digital receiver operates independently of the analog receiver such that, while the analog receiver is communicatively connected to the first antenna, the digital receiver can be communicatively disconnected from the first antenna to which the analog receiver is communicatively connected and can be communicatively connected to the second antenna, the method comprising:

communicatively connecting the digital receiver to the second antenna, wherein the digital receiver is communicatively connected to the second antenna for at least a first period of time and during the first period of time the digital receiver is not communicatively connected to the second antenna via the analog receiver;

communicatively connecting the analog receiver to the first antenna, wherein while the analog receiver is communicatively connected to the first antenna the digital receiver is not communicatively connected to the first antenna;

using the analog receiver to measure a first received signal power on the first antenna;

using the digital receiver to measure a second received signal power on the second antenna;

determining whether the first received signal power on the first antenna is greater than a first threshold, wherein the first threshold is a function of the second received signal power on the second antenna; and as a result of determining that the first received signal power is greater than the first threshold, communicatively connecting the baseband chain of the digital receiver to the first antenna.

15. The method of claim 14, wherein before connecting the baseband chain of the digital receiver to the first antenna, using the digital receiver to measure a first reference signal received power on the second antenna;

after connecting the baseband chain of the digital receiver to the first antenna, using the digital receiver to measure a second reference signal received power on the first antenna; and determining whether the second reference signal received power is greater than a second threshold, wherein the second threshold is a function of the first reference signal received power; and as a result of determining that the second reference signal received power is not greater than the second threshold, connecting the baseband chain of the digital receiver back to the second antenna.

16. The method of claim 15, wherein the first threshold is equal to the second received signal power plus a predetermined threshold value, and the second threshold is equal to the first reference signal received power plus a predetermined threshold value.

* * * * *